United States Patent [19]

Smith

[11] 4,151,890

[45] May 1, 1979

[54] WEIGHING APPARATUS

[75] Inventor: Alec B. Smith, 34 Flamboyant La., Estate Welcome, Christiansted, St. Croix, V.I. 00820

[73] Assignee: Alec B. Smith, Camden, N.J.

[21] Appl. No.: 842,599

[22] Filed: Oct. 17, 1977

[51] Int. Cl.² .................. G01G 3/00; G01G 3/08; G01N 29/00

[52] U.S. Cl. .................. 177/225; 177/229; 73/580

[58] Field of Search ......... 177/145, 225, 229, DIG. 9, 177/25

[56] References Cited

U.S. PATENT DOCUMENTS

| | | | |
|---|---|---|---|
| 3,148,742 | 9/1964 | Giulie | 177/229 X |
| 3,371,731 | 3/1968 | Connors et al. | 177/225 X |
| 3,443,653 | 5/1969 | Marshall | 177/229 X |
| 3,799,281 | 3/1974 | Wernitz | 177/DIG. 9 |
| 3,800,893 | 4/1974 | Ramsay et al. | 177/25 |
| 4,042,051 | 8/1977 | Ricciardi | 177/DIG. 9 |

Primary Examiner—George H. Miller, Jr.
Attorney, Agent, or Firm—Howson and Howson

[57] ABSTRACT

High-speed weighing apparatus in which the weighing platform responds to the pressure of an object thereon to produce an undamped oscillatory vertical motion indicative of the mass of the object on the platform. The platform is supported on a vertically-movable upright column, which in turn is spring-supported on a frame primarily by means of a flexure pivot support arrangement near its bottom end, which provides spring support for the platform and column to permit the vertical motion indicative of weight; it is also supported by another support arrangement operating on an upper portion of the column nearer the platform, for preventing tilting of the column without interfering with its vertical motion or with the weighing process. The second or upper support arrangement preferably comprises a horizontal flexible rod, secured at one end to the frame and at its other end to the upper part of the column.

24 Claims, 10 Drawing Figures

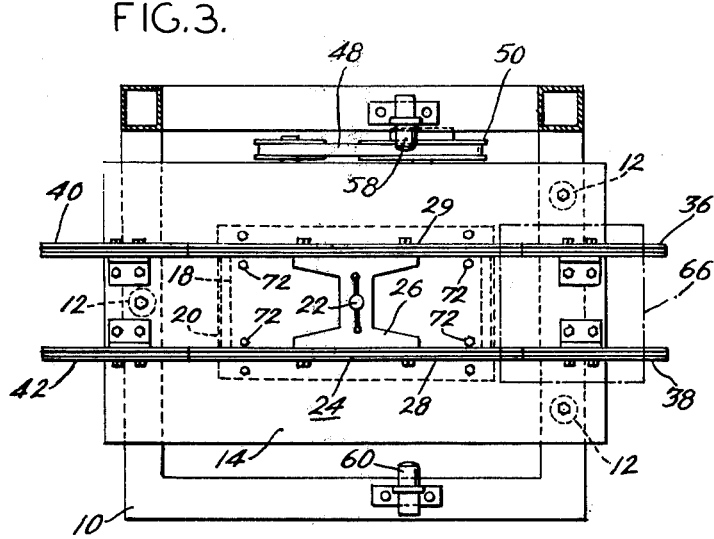
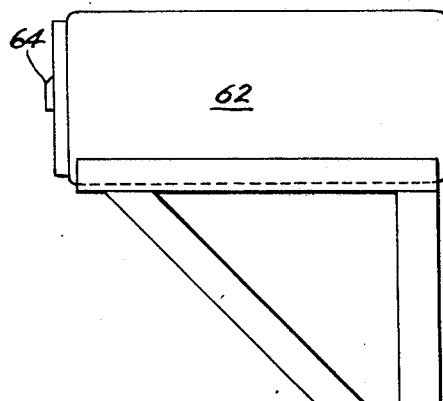
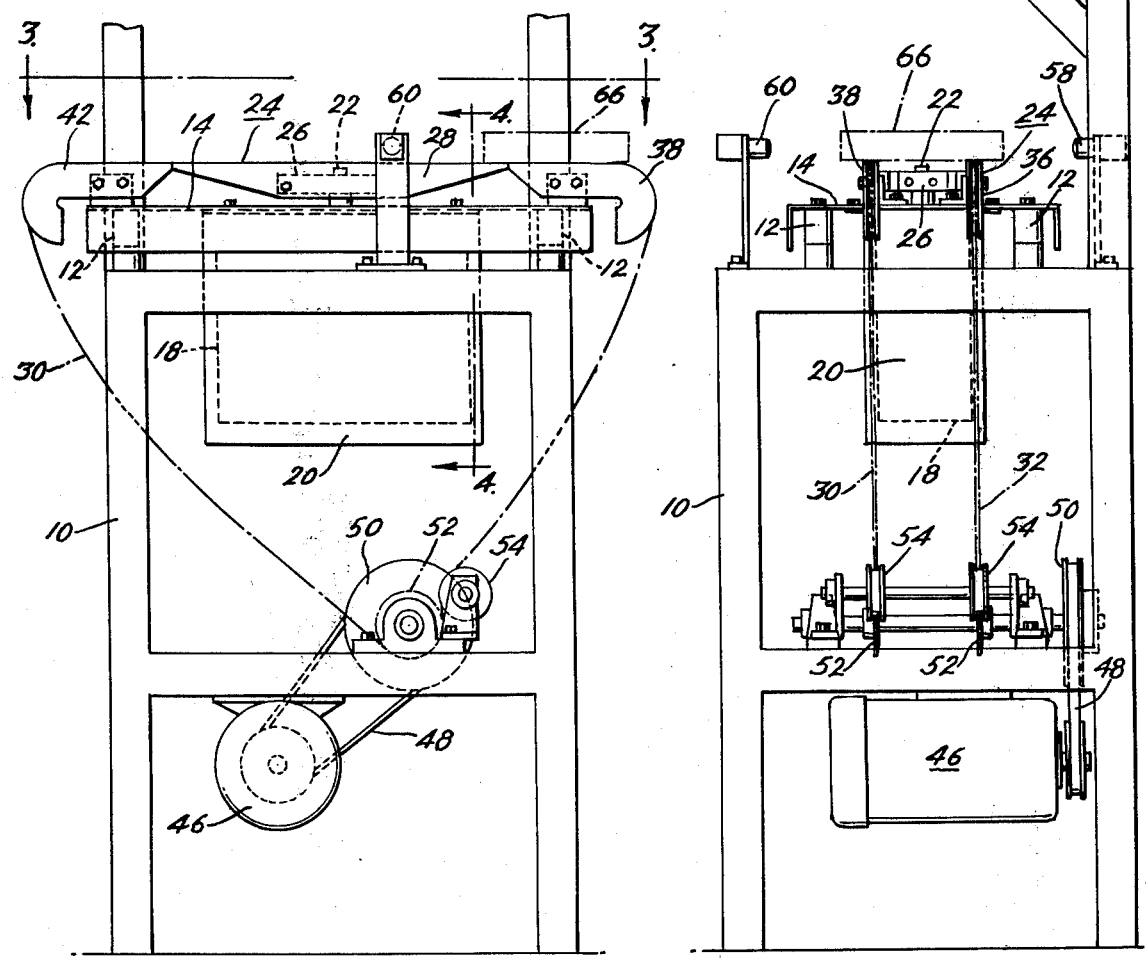

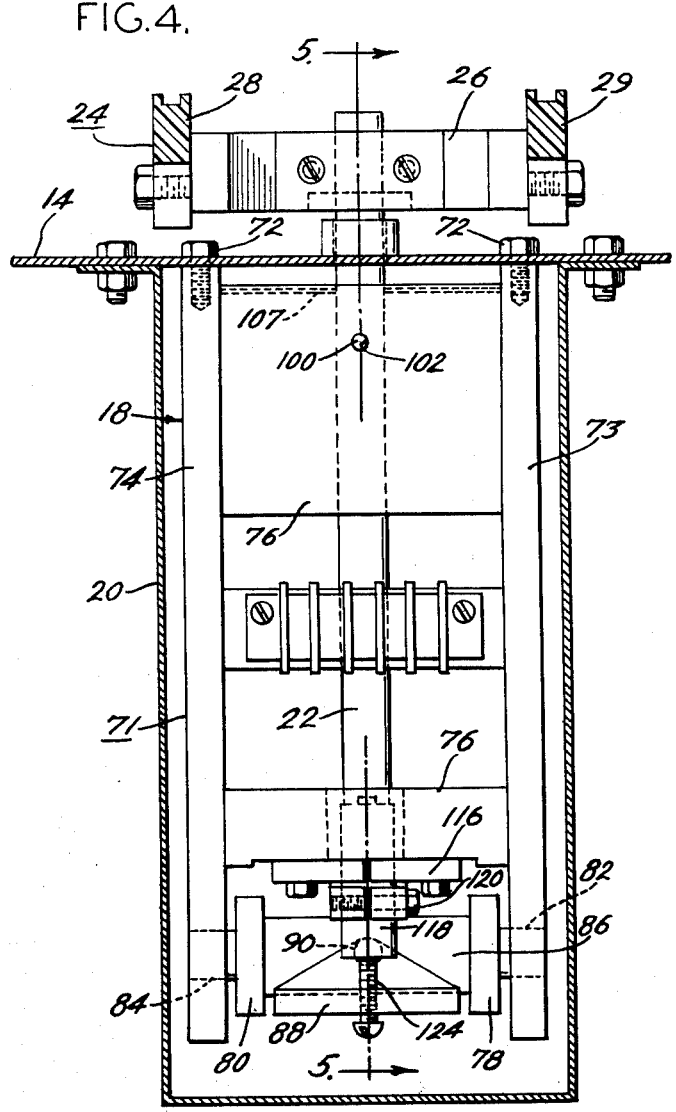
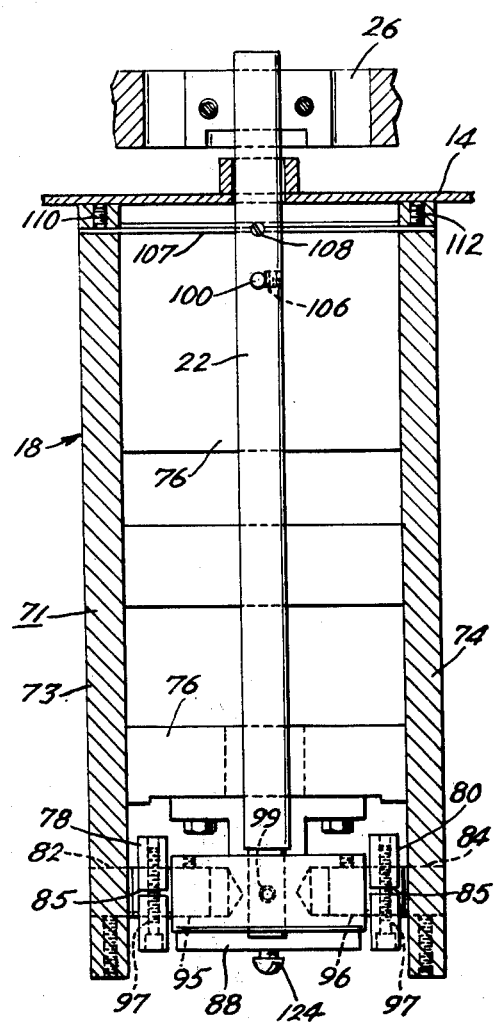
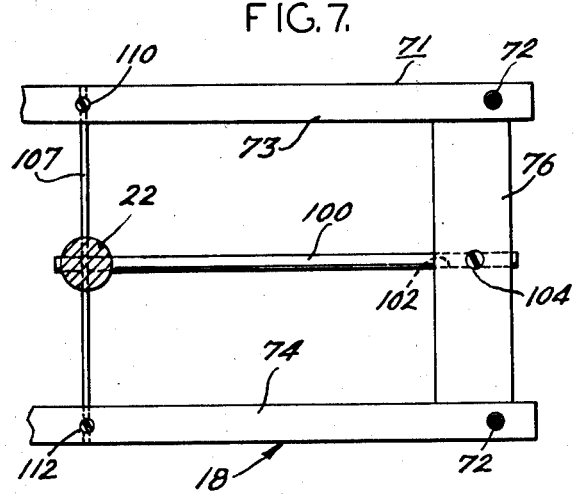
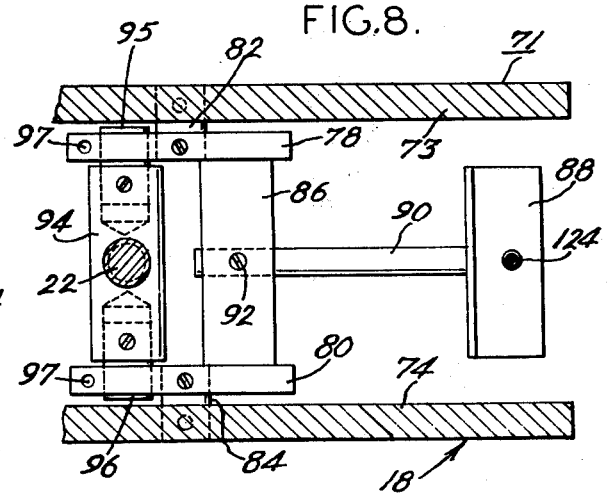

WEIGHING APPARATUS

BACKGROUND OF THE INVENTION

This invention relates to apparatus for the weighing of objects, and especially such apparatus which is suitable for check-weighing of each of a series or train of objects passed onto and from a weighing platform in rapid sequence.

U.S. Pat. No. 3,800,893 of Joseph D. Ramsay and George R. Weaver, filed Sept. 5, 1972 and issued Apr. 2, 1974 illustrates one form of weighing apparatus especially adapted to the high-speed weighing of a series of objects, such as food packages, as they are moved on a conveyor over a weighing platform. The weighing platform is supported at a distance from the balance point of a counter-balanced beam structure having a parallelogram-like form which permits the weighing platform to move vertically up-and-down as the beam tilts, and which also provides a corresponding up-and-down motion of a pick-off arm, the latter motion being sensed and used as an indication of the mass of an object on the platform. The pivots by which the column supporting the weighing platform is mounted on the beam balance are flexure pivots, which provide torsional restraint about the pivot axes at two different positions along the length of the supporting column, and similar flexure pivots are used for the pivots which join together the other members of the parallelogram structure. These flexure pivots provide a spring-restrained balanced-beam operation, since they produce a restoring torque around their respective axes against which the weight of the weighed object acts. In this specific form of weighing apparatus, electrical signals indicative of the vertical displacement, velocity of motion and acceleration of the platform and column during a portion of a cycle of oscillation of the balance are derived and fed to a computer, which is able to deduce and indicate the weight of each object from this information. Such an arrangement is useful for example, in checking that the package weight is within a predetermined range, and serves in such case as a high-speed check weigher.

While this weighing apparatus has proved very satisfactory for many purposes, in the general type of embodiment shown for example in FIGS. 10 and 11 of the above-identified patent the structure is relatively complex and expensive, and exhibits some temperature sensitivity.

In another form of high-speed check weigher which has been built and tested, there is instead utilized a simpler arrangement of an upper and a lower pivoted linkage, each of which is pivoted at one end about an axis fixed in the frame and at its other end about an axis fixed in the platform-supporting column. Flexure pivots are provided at each frame-fixed axis and at each column-fixed axis to provide restoring torques about these axes, opposing the downward motion of the column. The upper linkage is provided with a counter-balancing weight, on the opposite side of the frame-fixed axis from the column, which again establishes a balanced-beam, spring-restrained construction. The vertical motion of an extension of the upper linkage is sensed by an electrical pick-off, and the weight of an object on the platform is derived from the pick-off signals by means of computer circuitry. For proper operation, the structure is such that the column and weighing platform execute an undamped, or only lightly damped, osciallatory vertical motion of the simple harmonic type in response to changes in weight applied to the platform.

While the latter type of weighing apparatus has been found useful, it is again somewhat expensive and critical to construct and assemble properly, and is somewhat sensitive to changes in ambient temperature. It also is subject to some difficulty in adjusting the structure so that the springs associated with the upper and lower linkage will be at their zero-stress conditions for the same position of the column, as is considered desirable in such apparatus.

It is an object of the present invention to provide a new and useful weighing apparatus which is particularly simple and inexpensive, yet effective, and which enables elimination of some parts and simplification of others.

It is also an object to provide such a system which is easy to assemble and adjust, and which has low sensitivity to ambient temperature changes.

SUMMARY OF THE INVENTION

In accordance with the invention, there is provided an improvement in apparatus of the class comprising object-receiving means for receiving objects to be weighed, a frame, and resilient support means connected between the frame and the object-receiving means for providing spring mounting of the object-receiving means, the object-receiving means being adapted to move vertically in response to the weighing of objects thereon in a manner determined by the spring characteristics of the resilient support means, and means being provided for sensing said vertical motion to produce signals representative of the mass of said objects, to which mass the weight is related by a known constant at any location. According to the improvement of the invention, the resilient support means comprises flexure pivot means mounting a first portion of the object-receiving means on the frame and resiliently supporting a major portion of the weight of the object-receiving means and of the objects to be weighed, in combination with spring means secured to and extending between said frame and a second portion of the object-receiving means spaced vertically from said first portion, for restraining the object-receiving means against lateral motion thereof, the spring means being transversely resilient along the vertical direction to accommodate said vertical motion of the object-receiving means without substantial vertical restraint thereof.

Preferably, the dimension of the spring means along the direction from the frame to the object-receiving means is large compared with the vertical dimension to provide the desired vertical compliance, and in a preferred form comprises a rod-like member of spring material extending horizontally from the frame to the object-receiving means. In this preferred embodiment, filamentary means are preferably also used, which extend substantially horizontally between the second portion of the object-receiving means and the frame, at an angle to the rod-like member, to provide additional lateral support. This filamentary means preferably comprises a pair of filaments, smaller in cross-section than said rod-like member, extending horizontally and collinearly with each other, substantially at right angles to the rod-like member.

In the preferred form, the frame is a massive weldment of stainless steel, as are said spring means supporting the object-receiving means against lateral motion, so that these parts all have the same temperature coefficient of expansion. Preferably the object-receiving means comprises vertical columnar means supporting a weighing platform on which the objects to be weighed are received, and the flexure pivot means supports the lower end of the columnar means with respect to vertical motion and horizontal motion, while the spring means supports an upper part of the columnar means against horizontal or tilting motion. In this event, the columnar means is preferably also of stainless steel.

The flexure pivot means preferably comprises linkage means, preferably also of stainless steel, a first portion of which is pivotably mounted for rotation about a first horizontal pivot axis in the frame and a second portion of which is pivotably mounted for rotation about a second horizontal axis in said first portion of the object-receiving means, the flexure pivot means comprising flexure pivots producing torsional restraint about each of the pivot axes.

Preferably a part of the linkage means extends on the opposite side of the first pivot axis by a distance greater than the distance between the first and second pivot axes, whereby said part of said linkage means provides an amplified and reversed version of the vertical motion of the object-receiving means, from which signals representative of object mass may be obtained.

In a preferred form, the apparatus is used in combination with high-speed object weighing apparatus in which successive objects to be weighed are rapidly and automatically moved onto and from the object-receiving means, the instantaneous vertical displacement of the object-receiving means being sensed and converted to signals indicative of displacement, velocity and acceleration of the object-receiving means, from which signals computer circuitry form and solve the second-order differential equation of motion of the object-receiving means in response to the weight of each object, during a fraction of a cycle of oscillatory motion of the object-receiving means, to produce signals indicative of object weight.

Because the spring means, preferably acting on the upper end of the platform-supporting columnar means, has a low spring rate along the vertical direction compared with the spring rate of the flexure pivot means, it can be assembled easily and non-critically, and does not require precise machining of parts; the parts used in the spring means are also inexpensive, compared with a flexure pivot support. The low spring rate of the spring means utilized also makes less significant any changes in length of the object-receiving means, e.g. the columnar means, due to temperature change, or tolerances in manufacture or assembly. The use of a massive weldment for the frame, and of stainless steel whenever possible throughout the weigh cell, also enhances the temperature stability of the apparatus.

BRIEF DESCRIPTION OF FIGURES

These and other objects and features of the invention will be more readily understood from a consideration of the following detailed description, taken in connection with the appended drawings, in which:

FIG. 1 is a side view of a weighing system in which the invention finds special application;

FIG. 2 is a front view of the system of FIG. 1;

FIG. 3 is a sectional view of the system of FIG. 1, taken along lines 3—3.

FIG. 4 is a sectional view of one preferred form of the weigh cell of the invention, taken along lines 4—4 of FIG. 2;

FIG. 6 is a sectional view taken along lines 6—6 of FIG. 5;

FIG. 7 is a sectional view taken along lines 7—7 of FIG. 5;

FIG. 8 is a sectional view taken along lines 8—8 of FIG. 5;

DETAILED DESCRIPTION OF SPECIFIC EMBODIMENTS

Figure 5:
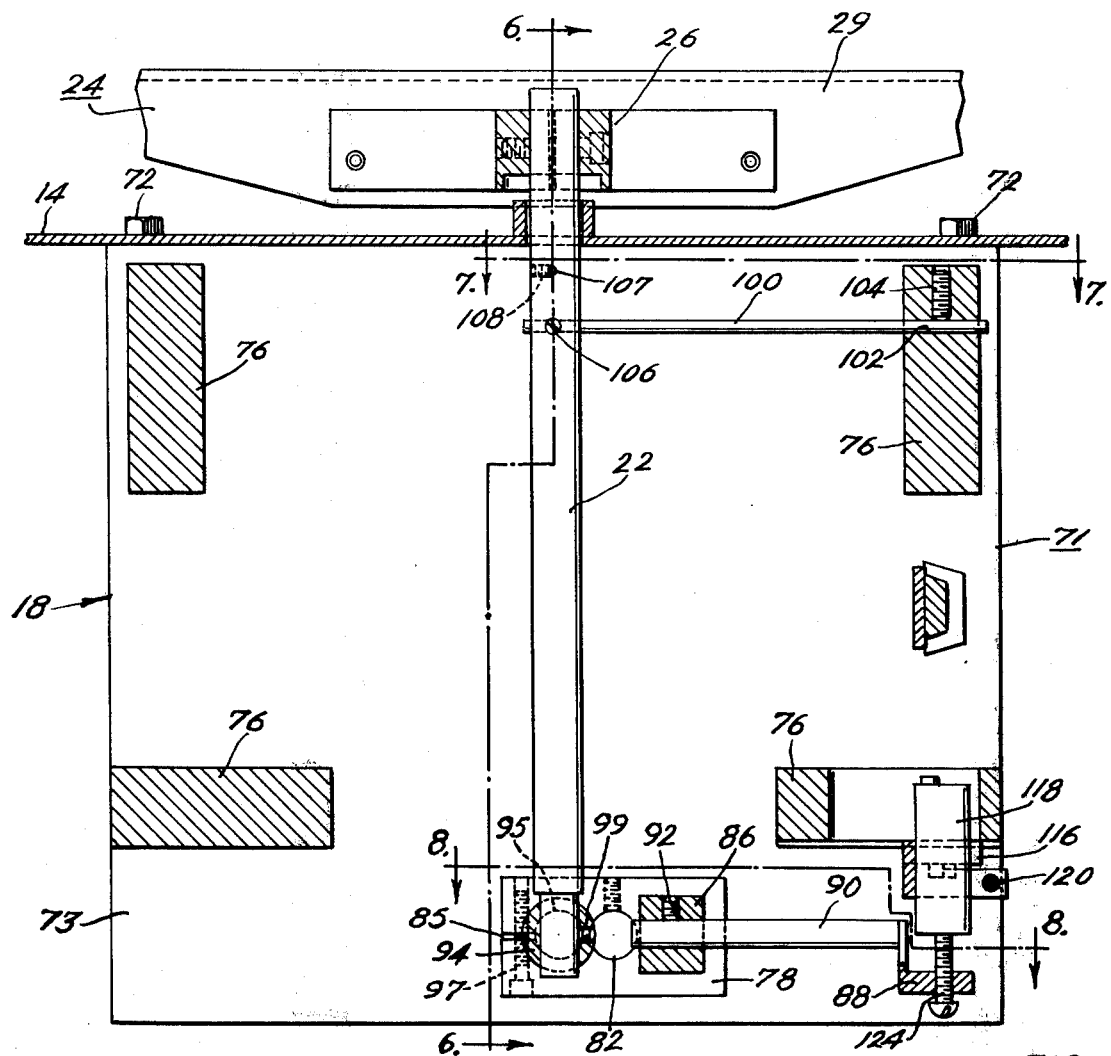
FIG. 5 is a sectional view taken along lines 5—5 of FIG. 4.
Figure 9:
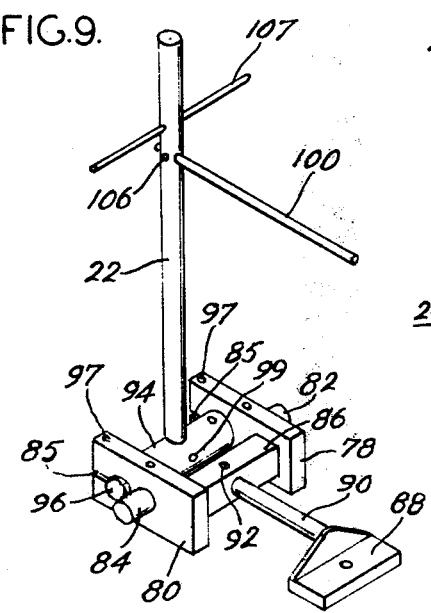
FIG. 9 is a perspective view of the spring-support system in the weigh cell of FIG. 5.

Referring now to the embodiments shown in the drawings by way of example only, FIGS. 1–3 especially illustrate the use of the invention in connection with the high-speed weighing of each of a train of spaced-apart objects such as food packages. In this apparatus, a main support frame 10 is provided with three top-plate mounts such as 12 for supporting a top plate 14 which extends horizontally over the mounts and is turned downwardly at its opposite edges to provide a general U-shaped cross section; appropriate weights or balance may be applied to the top plate to minimize transmission of undesired shock or vibration through the top plate to the weigh cell, if desired.

Beneath the center portion of the top plate there is suspended, by appropriate bolts, a weigh cell indicated generally at 18, comprising an outer weigh cell casing 20 and contents to be described hereinafter. For the present it is sufficient to note that a vertical weighing column 22 extends vertically upward from the interior of the weigh cell, through an appropriate clearance opening in the top plate, and a weigh platform generally indicated as 24 is mounted on the latter column. The weigh platform 24 comprises a guide mount 26 centrally mounted directly on the weigh cell column 22 by means of appropriate screws or the like, and a pair of center guide rails 28 and 29 secured by appropriate screws to the lateral sides of the center guide mount to provide parallel guides for a pair of chains 30 and 32 passing along the respective center guide rails. Two pairs of end guide rails 36, 38, 40 and 42 are mounted directly on top plate 14, each in alignment with an end of a corresponding center guide rail, with just sufficient clearance that the center guide rails can move freely up-and-down for a limited distance without touching the end guide rails.

Chains 30 and 32 are endless chains, driven from a motor 46 through a drive arrangement comprising a timing belt 48, a timing pulley 50, and sprockets 52 turning on the same drive shaft as timing pulley 50, acting together with idler pulleys 54 for maintaining the desired tension in the chains. Further details of this drive arrangement are not a part of the present invention, and therefore need not be described.

In this typical embodiment of the invention a photocell light source 58 is mounted on the frame above and at one side of the path of the chains, and a photocell detector 60 is correspondingly mounted on the opposite side, to provide timing information for controlling the electronic weighing action, for example along the lines described in U.S. Pat. No. 3,800,893 of Ramsay and Weaver, filed Sept. 5, 1972 and issued Apr. 2, 1974. The details of this object-detecting and timing arrangement not being a part of the present invention, they are not set forth herein in detail, and reference is made for such disclosure to the last-cited patent.

Also mounted on and above main support frame 10 is an electronics enclosure 62, to which signals derived by the weigh cell are supplied for processing and computation in electronics circuits contained in enclosure 62, with the end result of producing on digital readout 64 a digital indication of the weight of an object moving rapidly on the chains extending along the tops of the center guide rails, and/or whether the weight is above or below a standard weight; such an object 66 in the form of a food package is shown as it is about to exit from the guide rails onto a suitable following conveyor, the package having been delivered by another conveyor onto the input end of the opposite end guide rails 40 and 42 for high-speed weighing. It is understood that the packages are spaced apart from each other along the delivering conveyor at the input to the weigher, so that only one package is on the platform during each weighing time.

The foregoing describes the manner in which the series of objects to be weighed are supplied sequentially and at high speed onto the weight platform 24. The signals developed by the photocell detector 60, and certain pick-off signals developed by the weigh cell within casing 20, are supplied to the electronics circuitry in electronics enclosure 62 to provide the desired read-out of weigh information; the latter circuits may also produce other weight information signals with respect to the objects being weighed, which signals may be used for other control purposes, such as for automatically diverting an underweight or overweight object from the subsequent conveyor, if desired.

Referring now more particularly to FIGS. 4–9 showing the weigh cell itself in more detail, the weigh cell casing is preferably mounted by suitable bolts on the top plate 14, and within it is mounted a weigh cell frame or weldment 71, secured to the top place by the four bolts such as 72. The weldment is preferably made of two thick sidewalls 73 and 74 of stainless steel, secured together by welded cross-pieces such as 76, the assembly preferably being heat-treated to relieve strains therein.

Between the lower ends of the sidewalls a pair of pivot mounting plates 78 and 80 are supported by flexure pivots 82 and 84 respectively. These flexure pivots are preferably of a well-known commercially available type containing crossed-leaf-spring arrangements. Such flexure pivots are shown and described, for example, in the above-cited Ramsay and Weaver patent, and are commercially available from the Bendix Corporation of Utica, New York. In their present use, the exterior or casing of one end of flexure pivot 82 is secured, by a set screw, in an opening in wall 73, and at its other end is held in a corresponding opening in mounting plate 78 by an appropriate set-screw arrangement. The pivot mounting plates 78 and 80 can therefore be rotated slightly about a horizontal axis through the pivot axes of flexure pivots 82 and 84, with the flexure pivots producing torsional restraint opposing rotation of the mounting plates in either direction from a zero stress position common to both flexure pivots.

Between the two pivot mounting plates 78 and 80 there extends an integral cross-bar 86 serving as a bracket mounting bar for a transducer core bracket 88, secured thereto by an arm 90 and appropriate screw arrangement 92. As explained further hereinafter, the transducer core bracket 88 is part of the pick-off arrangement by which indication of object weight is obtained.

Mounted to and between the two pivot mounting plates is a column mount 94. Mount 94 is supported by a pair of flexure pivots 95 and 96 of the type described above, one end of each of these flexure pivots being mounted in one of the pivot mounting plates 78 and 80, and its opposite end secured in the column mount 94. The axes of flexure pivots 95 and 96 are horizontal and collinear, and each may be held in column mount 94 by appropriate set screws. To assist in securing the opposite ends of these flex pivots, the pivot mount plates 78 and 80 may be slit horizontally at 85, from one end to the openings which receive the flexure pivots 95 and 96, and a tapped hole and screw arrangement 97 may be used to clamp together the split-apart upper and lower parts of the pivot mounting plate, to provide a tight grip on the flexure pivot in each case.

Supported on column mount 94 is the vertical weighing column 22, in this example having a reduced diameter at its lower end which fits slidingly into a corresponding vertical opening in the column support so it can be adjusted vertically in the column support and then fixed in the selected position by tightening of a set screw 99.

The upper end portion of column 22 is supported against lateral tilting primarily by means of a main support rod 100, one end of which extends into a bore 102 in the weigh cell frame and is secured by an appropriate set screw 104; rod 100 extends horizontally and radially with respect to column 98, its radially-inward end extending through a corresponding bore in column 22 where it is secured by tightening of a set screw 106. In the preferred form shown, rod 100 extends parallel to the guide rails and chains on the weigh platform, the direction of motion of objects to be weighed preferably being from left to right in FIG. 5 so that the rod extends "downstream" from the column to the weigh cell frame.

Additonal lateral stsbility of the upper end of the column 22 is preferably provided in this embodiment by means of a cross-support filament wire 107, which extends through a horizontal central hole in the column 22, along a horizontal direction and at right angles to rod 100, the outer opposite ends of the cross-support wire extending into openings in the opposite sides of the weigh cell frame. When the rod, column and cross-wires have been adjusted to the proper relative positions, the set screw 108 in the column is tightened to clamp the cross-support wire at that point, and set screw 110 and 112 are tightened to clamp the cross wire at its opposite ends. The two halves of wire 107 act the same as if two separate wires had been used on opposite sides of column 22, and may therefore be considered as being two wires or filaments.

Above the outer end of transducer core bracket 88, a transducer bracket 116 is secured to the weigh cell frame. The latter bracket, in turn, holds a transducer 118, which can be slid upwards and downwards slightly for purposes of adjustment and held in its final position by tightening of screw 120. A screw 124, threaded in the end of transducer bracket 88, permits adjustment of the zero position of a slug within transducer 118.

It will be understood that transducer 118 operates in known manner in connection with appropriate conventional circuits within electronics enclosure 62, to produce signals indicative of the instantaneous vertical position of the outer end of the transducer core bracket 88, and to derive therefrom electrical signals to be used for deriving indications of object weight. Typically, the transducer produces an indication of instantaneous displacement of the transducer core bracket from a rest position, from which the electrical circuitry may then derive signals indicative not only of displacement but also of velocity and acceleration of the transducer core bracket, from which signals the computer is able to produce accurate indications of the weight of the object in extremely short times.

In operation then, with the apparatus assembled as shown, objects to be weighed such as 66 are automatically supplied in spaced-apart rapid succession onto the chain on the top of the weighing platform, carried across the platform by the chain and then delivered to another conveyor at the opposite side of the weighing apparatus. While each object is on the weighing platform, its weight will cause column 22 to execute a lightly-damped oscillatory vertical motion in conjunction with the spring restraint provided by the two pairs of flexure pivots in the lower support arrangement, namely flexure pivots 82,84, 95 and 96 which, by exerting torsional restraint about their respective axes, tend to oppose the downward motion of the column 22. Motion of column 22 causes an opposite direction of vertical tilting of the right-hand end of the bracket mounting bar 86 and of the screw 124 carrying the slug inside of transducer 118. This motion of the slug in transducer 118, caused by corresponding motion of column 22, provides the desired indication of the mass of the object on the platform, from which the computer electronics is able rapidly to produce information as to whether the weight of the object is above or below a pre-set standard.

It will be seen that the pivot-mounting plates 78 and 80 constitute a linkage one portion of which is pivotably mounted to the lower end of the colum 22 and another portion of which is pivotably supported on the weigh cell frame, with torsional spring restraint provided around the pivot axes to oppose downward displacement of the weighing column from its rest position. The lower flexure pivot arrangement and the upper arrangement of rod and cross wires constrains the column 22 to move upwardly and downwardly substantially only along a fixed vertical direction. Main support rod 100 is preferably sufficiently thick in cross-section that it will not buckle, and its tensile strength will not be exceeded, in response to normally-encountered forces acting in either direction along its axis. While in many cases in which the cell has been assembled in its upright position and remains in this position, the lateral stiffness of the rod will be adequate to hold the column 22 against tilting in any direction, it is preferred to use the above-described cross wires to provide additional stability along directions at angles to the rod. The combination of the rod and the cross wires provides a very stable and strong configuration for supporting the upper end of column 22, yet both the rod and the cross wires have sufficient transverse resilience for motion along the vertical direction to permit the desired vertical weighing motions of column 22, without interference. Since these motions are typically very small, the rod and cross-wire support for the top end of the column 22 does not produce any appreciable tilting of the column due to the slight arc to which the upper portion of the column is constrained to move by the rod. The rod and cross-wire construction, in addition, does not introduce any appreciable damping into the essentially oscillatory motion of the column 98, and thus permits very rapid response of the column and weighing platform system to the object being weighed, as is desired for high-speed weighing, and permits the simple harmonic vertical motion of the column which is desired for best operation of the computer circuitry.

As an example only, rod 100 may be of ⅛" diameter stainless steel about 5 inches in free length, and cross-wire 107 may be 1/32" diameter piano wire extending about 2 inches on each side of column 22, for a weigh cell designed to weigh objects of about 1 pound with maximum vertical deflection of the column 22 of less than 1/64". In such case the spring rate of rod 100 for bending along the vertical may be about 5-pound inches per radian of angular deflection, which is typically less than 1.5% of the spring rate of the combination of flexure pivots used in the lower support system. Also typically, the height of column 22 from bottom support to rod 100 may be about 8 inches, and the distance between the axes of the pairs of flexure pivots about ¾". The cross-wire 107 may be strung substantially taut between its supports, and still will exert negligible vertical restraint on column 22, as preferred, because of the very small vertical motion which the column executes in use.

Figure 10:
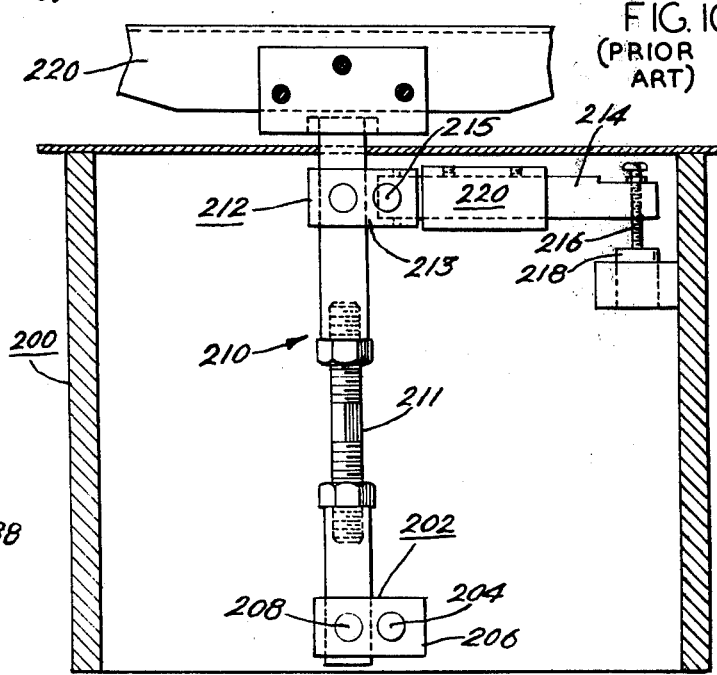
FIG. 10 is a front view, partly in section, of a weigh cell of the prior art.

FIG. 10 illustrates a system of the prior art. In this system, instead of a weldment there was used a four-sided aluminum housing 200 screwed together in a box-like configuration, the lower flexure pivot arrangement 202 utilizing one pair of flexure pivots arranged along axis 204 to support a linkage 206 on the sidewalls of the weigh cell frame, and another pair of flexure pivots acting along axis 208 for mounting the weighing column 210, which included an adjustable turn-buckle arrangement 211. A similar flex-pivot arrangement 212 was used near the top of the column 210, the linkage 213 in this case extending to the right beyond the pivot axis 215 to form a pick-off arm 214 on which the screw 216 is mounted for vertical movement to control pick-off in transducer 218. A counter-balancing weight 220 was provided on pick-off arm 214, and was adjustable along the length of the arm to provide different degrees of counterbalancing depending upon the weight of the objects to be weighed. In this arrangement of the prior art then, the weighing platform 220 received the objects to be weighed, which caused the platform and the column 210 to move downwardly against the spring restraint provided by the four pairs of flex pivots in the upper and lower flexure pivot assemblies, the resultant motion being sensed and converted to electrical signals by the transducer 218.

It is noted that the apparatus of the present invention differs importantly from the prior-art apparatus of FIG. 10 in that the upper flexure arrangement 212 of the prior art has been eliminated, and instead there is used a simple arrangement of rod 100 and cross-wire 107. This in itself represents a substantial saving in costs of parts. Further, to set up the support system of the invention, one need only adjust column 22 non-critically to approximately the desired position, and insert and clamp the rod 100 and cross-wire 107; there is no upper flexure pivot arrangement requiring precise vertical positioning and accurate angular adjustment of flexure pivots, and no need for accurate machining to locate the pivot axes of an upper set of pivots precisely with respect to each other and to the lower set of pivot axes. In addition, minor thermal expansion or contraction of the column 22 is readily accommodated by the compliant upper spring support system without appreciable effect on weighing accuracy, whereas in the prior-art system of FIG. 10 such thermal expansion or contraction introduces appreciable undesired forces between the upper and lower flexure pivots.

As to temperature effects, the use of a material having the same temperature coefficient of expansion for the weigh cell frame 200, the column 22 and the rod 100 aids in minimizing any effects of differential thermal expansion; the use of stainless steel for these parts is considered to be especially beneficial in this respect, as is the massive nature of the frame, which in a typical case has walls 74 about ½" thick and cross-members 76 are even thicker, providing an effective heat sink. The welded integral, heat-normalized weigh-cell frame also enhances the mechanical and thermal stability of the apparatus, as compared with the screwed-together aluminum cell of the prior art.

While the invention has been shown and described with particular reference with specific embodiments thereof, it will be understood that it may be embodied in a variety of forms diverse from those specifically shown and described, without departing from the spirit and scope of the invention as defined by the appended claims.

What is claimed is:

1. In weighing apparatus of the class comprising object-receiving means for receiving objects to be weighed, a frame, resilient support means connected between said frame and said object-receiving means for providing spring mounting of said object-receiving means on said frame, said object-receiving means being adapted to move vertically with substantially undamped simple harmonic motion in response to the placement thereon of each of said objects in a manner determined by the spring characteristics of said resilient support means and the mass of said each object, and means for enabling sensing of the vertical displacement, velocity and acceleration of said each object on said object-receiving means to produce signals representative of the mass of said each object, the improvement wherein:

said resilient support means comprises flexure pivot means mounting a first portion of said object-receiving means on said frame and resiliently supporting the major portion of the weight of said object-receiving means and of said objects to be weighed, and cantilevered spring means secured to and extending substantially horizontally between said frame and a second portion of said object-receiving means spaced vertically from said first portion, for restraining said object-receiving means against lateral motion thereof, said spring means being longitudinally rigid but transversely resilient along the vertical direction to accommodate said vertical motion of said object-receiving means without substantial vertical restraint thereof.

2. The apparatus of claim 1, wherein said frame and said spring means have substantially the same temperature coefficient of expansion.

3. The apparatus of claim 2, wherein said frame and said spring means are of stainless steel.

4. The apparatus of claim 1, wherein said frame is a massive weldment of stainless steel.

5. The apparatus of claim 4, wherein each of said flexure pivots means comprises outer casing means and flexure springs secured to said outer casing means, said outer casing means and said flexure springs being of stainless steel.

6. The apparatus of claim 1, wherein said flexure pivot means comprises linkage means, a first portion of which is pivotably mounted for rotation about a first horizontal pivot axis in said frame and a second portion of which is pivotably mounted for rotation about a second horizontal pivot axis in said first portion of said object-receiving means, said flexure pivot means producing torsional spring restraint about each of said pivot axes to provide said resilient support.

7. The apparatus of claim 6, wherein a part of said linkage means extends on the opposite side of said first pivot axis by a distance greater than the spacing between said first and second pivot axes, whereby said part of said linkage means provides an amplified and reversed version of the vertical motion of said object-receiving means.

8. The apparatus of claim 1, wherein the dimension of said spring means along the direction from said frame to said second portion of said object-receiving means is large compared with the vertical dimension thereof.

9. The apparatus of claim 8, wherein said spring means comprises a rod-like member of spring material.

10. The apparatus of claim 9, also comprising filamentary means extending substantially horizontally from said second portion of said object-receiving means to said frame at an angle to said rod-like member.

11. The apparatus of claim 10, wherein said filamentary means comprises filaments secured to and extending substantially horizontally between said object-receiving means and said frame.

12. The apparatus of claim 11, wherein said filaments extend collinearly with each other in opposite directions from said object-receiving means substantially at right angles to said rod-like member.

13. The apparatus of claim 12, wherein each of said filaments is smaller in cross-section and of smaller spring constant than said rod-like member.

14. In weighing apparatus of the class in which objects to be weighed are delivered along an object-flow direction successively onto and from a weighing platform which responds to the placement of an object thereon to produce a detectable substantially undamped simple harmonic vertical motion thereof representative of the mass of the object on the platform, said platform being mounted on vertically-movable upright columnar means which is supported on a frame by first and second support means in a manner to permit said substantially undamped simple harmonic vertical motion; said first support means comprising linkage means a first portion of which is pivotable mounted for rotation about a first horizontal pivot axis in said frame, a second portion of said linkage means being pivotably mounted for rotation about a second horizontal pivot axis in a first portion of said columnar means, and flexure pivot means associated with said linkage means for exerting a restoring torque about at least one of said pivot axes to provide spring support for said columnar means and platform; said second support means being connected to a second portion of said columnar means between said platform and said first portion of said columnar means to restrict lateral motion of said columnar means while permitting said vertical motion thereof; and means for enabling the sensing of the vertical displacement, velocity and acceleration of said object when placed on said weighing platform to produce signals representative of the mass of said object; the improvement wherein said second support means comprises cantilevered spring means extending substantially horizontally and radially of said columnar means and secured to said frame and to said second portion of said columnar means, said spring means being longitudinally rigid but transversely resilient in the vertical direction to accommodate repeated up-and-down motion of said columnar means.

15. The apparatus of claim 14, wherein said flexure pivot means exerts a restoring torque about both of said pivot axes.

16. The apparatus of claim 14, wherein the vertical spring restraint provided by said spring means is small compared with that provided by said flexure pivot means.

17. The apparatus of claim 15, wherein said frame comprises a unitary welded stainless steel structure to which are secured the radially-outward end of said spring means and the frame-fixed portion of said flexure pivot means, said spring means being also of stainless steel.

18. The apparatus of claim 17, comprising first and second filamentary members of lighter gauge than said spring means, said first and second filamentary members extending radially outwardly and collinearly from opposite sides of said columnar means, and each secured at one end to said columnar means and at its other end to said stainless steel structure, said columnar means also being of stainless steel.

19. The apparatus of claim 14, wherein the spring constant of said flexure pivot means is large compared with that of said spring means.

20. The apparatus of claim 19, wherein the spring restraint of vertical motion of said columnar means by said flexure pivot means is at least an order of magnitude greater than the spring restraint of vertical motion of said columnar means by said spring means.

21. The apparatus of claim 14, wherein said spring means comprises rod means secured at one end to said frame and at its other end to said columnar means.

22. The apparatus of claim 21, comprising a first substantially horizontal filamentary member secured at one end to said frame and at its other end to said second portion of said columnar means, and extending substantially at right angles to said rod means; and a second substantially horizontal filamentary member secured at one end to said frame on the opposite side of said columnar means from said first filamentary member and at its other end to said columnar means, said second filamentary member extending substantially collinearly with said first filamentary member and substantially at right angles to said rod means.

23. The apparatus of claim 22, wherein said rod means and said first and second filamentary means comprise the sole lateral support at said second portion of said columnar means.

24. The apparatus of claim 22, wherein each of said filamentary members has a tensile strength small compared with that of said rod means.

* * * * *

UNITED STATES PATENT AND TRADEMARK OFFICE
CERTIFICATE OF CORRECTION

PATENT NO. : 4,151,890

DATED : May 1, 1979

INVENTOR(S) : Alec B. Smith

It is certified that error appears in the above–identified patent and that said Letters Patent are hereby corrected as shown below:

Column 11, line 16, "15" should read --14--.

Column 1 of the first page of text, after "[73]", delete "Alec B. Smith" and substitute --Campbell Soup Company--.

Page 1, line 2 of the Abstract, "pressure" should read --presence--.

Column 6, line 40, "Additonal" should read --Additional--.

Column 6, line 40, "stsbility" should read --stability--.

Signed and Sealed this

Eleventh Day of September 1979

[SEAL]

Attest:

Attesting Officer

LUTRELLE F. PARKER
Acting Commissioner of Patents and Trademarks